United States Patent
Yin et al.

(10) Patent No.: US 9,981,359 B2
(45) Date of Patent: May 29, 2018

(54) BROKEN TOOL DETECTION MECHANISM AND COMPUTER NUMERICAL CONROL MACHINE USING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Bang-Bing Yin, Shenzhen (CN); Le-Hua Li, Shenzhen (CN); Wei Qu, Shenzhen (CN); Wei-Min Yang, Shenzhen (CN); Xue Qin, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 432 days.

(21) Appl. No.: 14/716,459

(22) Filed: May 19, 2015

(65) Prior Publication Data
US 2016/0193708 A1 Jul. 7, 2016

(30) Foreign Application Priority Data
Jan. 5, 2015 (CN) .................... 2015 2 0003294 U

(51) Int. Cl.
*B23Q 17/09* (2006.01)
*G05B 19/4065* (2006.01)
*B23Q 17/22* (2006.01)

(52) U.S. Cl.
CPC ..... *B23Q 17/0909* (2013.01); *G05B 19/4065* (2013.01); *B23Q 17/22* (2013.01); *G05B 2219/50276* (2013.01)

(58) Field of Classification Search
CPC ................. G05B 19/4065; B23Q 17/0909
See application file for complete search history.

(56) References Cited

U.S. PATENT DOCUMENTS 3,872,415 A * 3/1975 Clarke ...................... D06L 1/08
337/131

* cited by examiner

*Primary Examiner* — Paul West
(74) *Attorney, Agent, or Firm* — ScienBiziP, P.C.

(57) ABSTRACT

A broken tool detection mechanism applied in a CNC machine includes a base support, a first conductive elastic sheet securely mounted on the base support, and a second conductive elastic sheet. The second conductive elastic sheet is mounted on the base support, at least partially located over the first conductive elastic sheet, and spaced apart from the second conductive elastic sheet by a predetermined distance. The second conductive elastic sheet is pushed towards the first conductive elastic sheet so that the first conductive elastic sheet and the second conductive elastic sheet make electrical contact.

11 Claims, 3 Drawing Sheets

BROKEN TOOL DETECTION MECHANISM AND COMPUTER NUMERICAL CONROL MACHINE USING SAME

FIELD

The subject matter herein generally relates to computer numerical control machines, and in particular a broken tool detection mechanism employed on a computer numerical control machine.

BACKGROUND

Tools are often employed on computer numerical control (CNC) machine to process work pieces. The tools having a small diameter are easily worn-out or broken in machining

BRIEF DESCRIPTION OF THE DRAWINGS

Implementations of the present technology will now be described, by way of example only, with reference to the attached figures.

DETAILED DESCRIPTION

Figure 1:
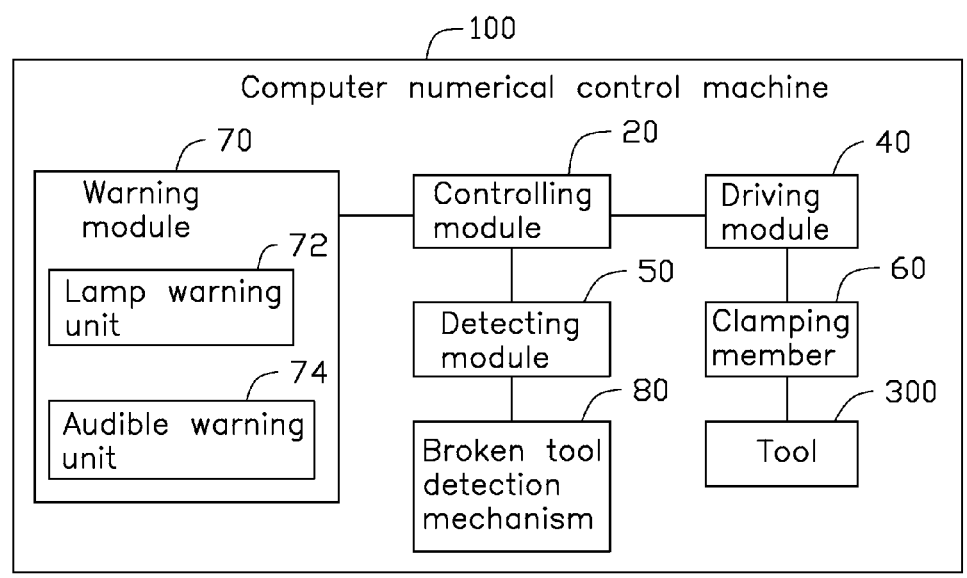
FIG. 1 is block diagram of an embodiment of a computer numerical control machine.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A broken tool detection mechanism can include a base support, a first conductive elastic sheet securely mounted on the base support, and a second conductive elastic sheet securely mounted on the base support and at least partially located over the first conductive elastic sheet. The second conductive elastic sheet can be spaced apart from the first conductive elastic sheet by a predetermined distance. The second conductive elastic sheet is pushed towards the first conductive elastic sheet so that the first conductive elastic sheet and the second conductive elastic sheet make electrical contact.

A computer numerical control machine can include a controlling module, a broken tool detection mechanism, and a detecting module. The broken tool detection mechanism can include a base support, a first conductive elastic sheet securely mounted on the base support, and a second conductive elastic sheet securely mounted on the base support and at least partially located over the first conductive elastic sheet. The second conductive elastic sheet can be spaced apart from the first conductive elastic sheet by a predetermined distance. The second conductive elastic sheet is pushed towards the first conductive elastic sheet so that the first conductive elastic sheet and the second conductive elastic sheet make electrical contact. The detecting module can be electrically coupled to the first conductive elastic sheet, the second conductive elastic sheet, and the controlling module. The detecting module can be configured to detect electrical contact between the first conductive elastic sheet and the second conductive elastic sheet, and to send a result of detecting to the controlling module.

FIG. 1 illustrates an embodiment of a computer numerical control (CNC) machine 100. The CNC machine 100 can include a controlling module 20, a driving module 40, a detecting module 50, a clamping member 60, a warning module 70, and a broken tool detection mechanism 80.

The driving module 40 can be electrically coupled to the controlling module 20. The clamping member 60 can be coupled to the driving module 40, to clamp and hold a tool 300. The controlling module 20 can command the driving module 40 to drive the clamping member 60 to move in a predetermined direction, thus the driving module 40 drives the tool 300 to process a work piece (not shown). The broken tool detection mechanism 80 can be coupled to the controlling module 20 via the detecting module 50. The CNC machine 100 further includes other elements (not shown) well known in the art.

The warning module 70 can be electrically coupled to the controlling module 20, to issue warnings. The warning module 70 can include a lamp warning unit 72 and an audible warning unit 74. The controlling module 20 can send an order to the warning module 70. The warning module 70 can receive the order, and control the lamp warning unit 72 and the audible warning unit 74 to give or sound a warning.

Figure 2:
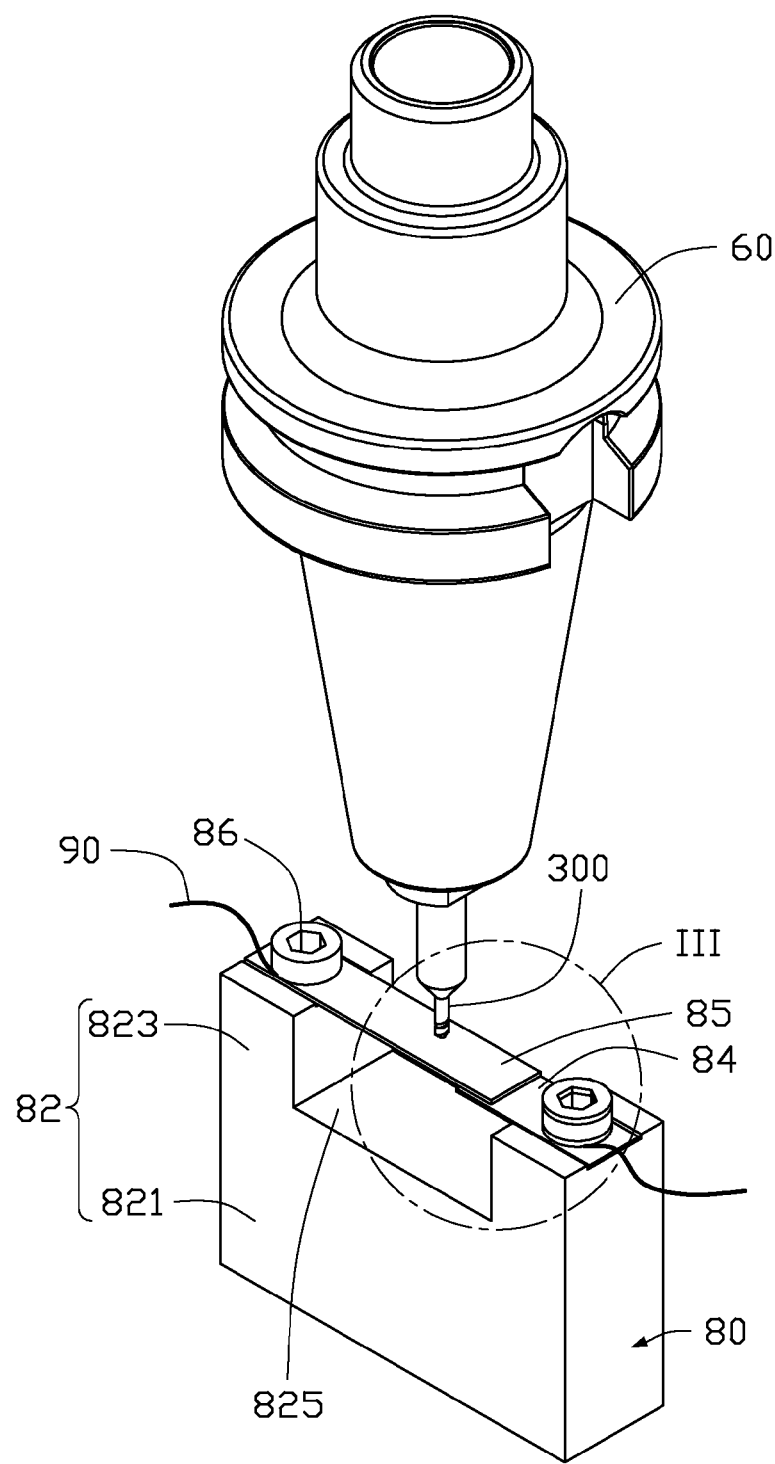
FIG. 2 is an isometric view of an embodiment of a broken tool detection mechanism in a state of use.
Figure 3:
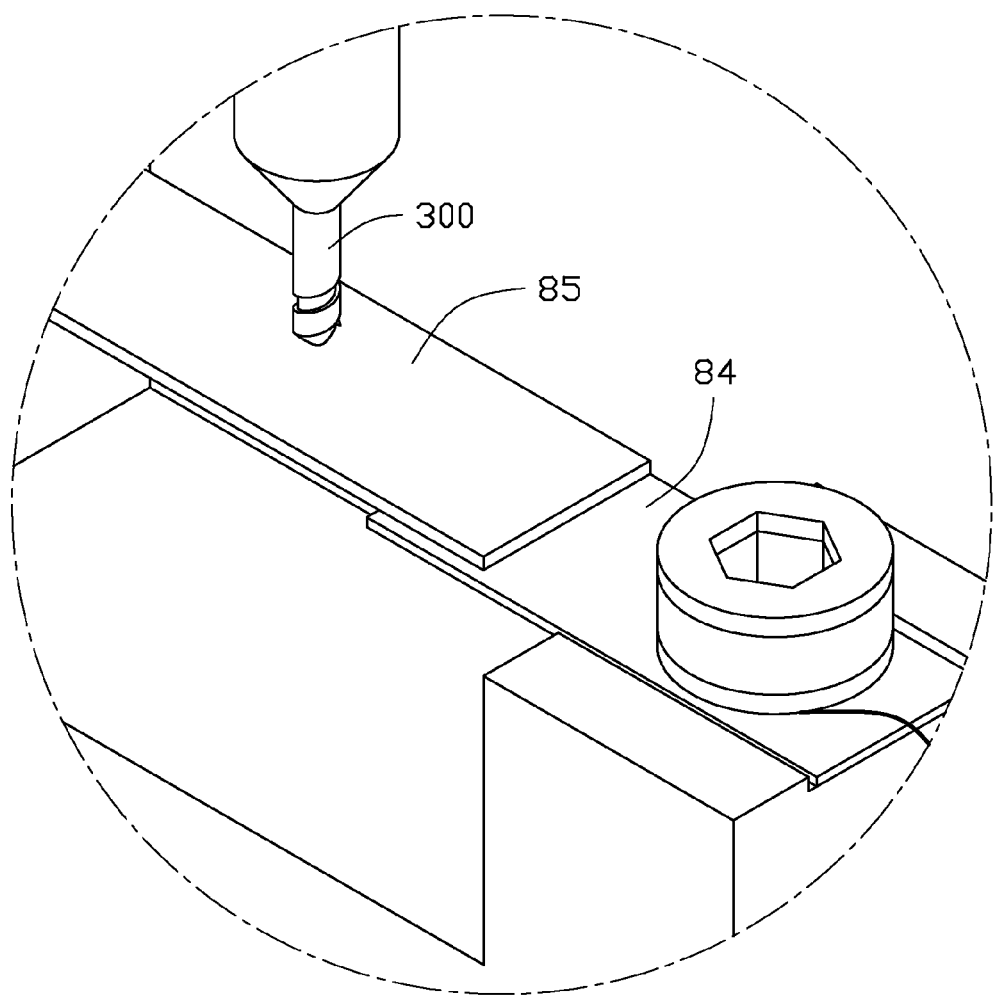
FIG. 3 is an enlarged view of circle III of FIG. 2.

FIGS. 1 to 3 illustrate that the broken tool detection mechanism 80 can include a base support 82, a first conductive elastic sheet 84, a second conductive elastic sheet 85, and two fastening members 86. In at least one embodiment, the broken tool detection mechanism 80 can be mounted on the machine tool (not shown). The base support 82 can be substantially rectangular. The base support 82 can include a support body 821, and two mounting portions 823 protruding from an end of the support body 821 and spaced from each other. An end face of the support body 821 and opposite side surfaces of the mounting portions 823 can cooperatively define a space 825. A first end of the first conductive elastic sheet 84 can be securely coupled to one mounting portion 823 via one fastening member 56, a second end of the first conductive elastic sheet 84 can be located over the space 825. The first end of the second conductive elastic sheet 85 can be securely coupled to another mounting portion 823 via another fastening member 56, the second end of the second conductive elastic sheet 85 can be located over the first conductive elastic sheet 84. A distance between the first conductive elastic sheet 84 and the second conductive elastic sheet 85 can be about 0.5 millimeters. In at least one embodiment, the CNC machine 100 further includes two electric wires 90; the first conductive elastic sheet 84 and the second conductive elastic sheet 85 can each be electrically coupled to the detecting module 50 via the electric wires 90. In at least one embodiment, the fastening members 86 can be pins.

The detecting module 50 can be configured to detect electrical contact between the first conductive elastic sheet 84 and the second conductive elastic sheet 85, and send a result of detecting to the controlling module 20. The controlling module 20 can then act upon the detection.

After the tool 300 processes the work piece driven by the driving module 40, the controlling module 20 can control the driving module 40 to move. The driving module 40 can move the clamping member 60 above the broken tool detection mechanism 80, and then the tool 300 mounted on the clamping member 60 is moved to touch the second conductive elastic sheet 85. The driving module 40 can then move the tool 300 a predetermined distance toward the first conductive elastic sheet 84, thus the second conductive elastic sheet 85 is pushed to move the predetermined distance toward the first conductive elastic sheet 84. The predetermined distance can be about 0.5 millimeters.

If the tool 300 is not broken, the second conductive elastic sheet 85 when pushed can touch the first conductive elastic sheet 84, and the second conductive elastic sheet 85 and the first conductive elastic sheet 84 can make electrical contact. The detecting module 50 can then send a first result of detecting to the controlling module 20, the controlling module 20 then controls the tool 300 to move away from the broken tool detection mechanism 80 and continue to process other work pieces.

If the tool 300 is broken, the second conductive elastic sheet 85 does not touch the first conductive elastic sheet 84 when pushed by the tool 300, and the second conductive elastic sheet 85 and the first conductive elastic sheet 84 do not meet and do not conduct. The detecting module 50 can then send a second result of detecting to the controlling module 20, and the controlling module 20 sends an order to the warning module 70. The warning module 70 controls the lamp warning unit 72 and the audible warning unit 74 to give or sound warnings to a user (not shown) to replace the broken tool 300. The controlling module 20 further controls the CNC machine 100 to stop working, thus the user can easily replace the broken tool 300.

In at least one embodiment, the predetermined distance between the second conductive elastic sheet 85 and the first conductive elastic sheet 84 can be changed as needed, so long as the displacement distance of the tool 300 after the tool 300 touches the second conductive elastic sheet 85 remains equal to the predetermined distance. In at least one embodiment, the warning module 70 can be omitted. In at least one embodiment, the driving module 40 and the clamping member 60 can be omitted, and the tool 300 can be held and moved by a mechanical arm (not shown).

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:

1. A broken tool detection mechanism comprising:
   a base support comprising:
     a support body; and
     two mounting portions protruding from an end of the support body and spaced from each other;
   a first conductive elastic sheet securely mounted on one of the mounting portions; and
   a second conductive elastic sheet securely mounted on the other one of the mounting portions and at least partially located over the first conductive elastic sheet, the second conductive elastic sheet being spaced apart from the first conductive elastic sheet by a predetermined distance;
   wherein an end face of the support body and two opposite side surfaces of the mounting portions cooperatively define a space; one end of the first conductive elastic sheet is securely mounted onto the corresponding mounting portion and opposite away from the support body, and another end of the first conductive elastic sheet is located over the space; one end of the second conductive elastic sheet is securely mounted onto the corresponding mounting portion and opposite away from the support body, and another end of the second conductive elastic sheet is located over the space and upon the first conductive elastic sheet; and
   wherein the second conductive elastic sheet is pushed towards the first conductive elastic sheet so that the first conductive elastic sheet and the second conductive elastic sheet make electrical contact.

2. The broken tool detection mechanism of claim 1, wherein the predetermined distance between the first conductive elastic sheet and the second conductive elastic sheet is about 0.5 millimeters.

3. The broken tool detection mechanism of claim 1, further comprising two fastening members configured for fastening the first conductive elastic sheet and the second conductive elastic sheet to the base support.

4. A computer numerical control machine comprising:
   a controlling module;
   a broken tool detection mechanism comprising:
     a base support,
     a first conductive elastic sheet securely mounted on the base support, and
     a second conductive elastic sheet securely mounted on the base support and at least partially located over the first conductive elastic sheet, the second conductive elastic sheet being spaced apart from the first conductive elastic sheet by a predetermined distance,
   wherein the second conductive elastic sheet is pushed towards the first conductive elastic sheet so that the first conductive elastic sheet and the second conductive elastic sheet make electrical contact; and
   a detecting module electrically coupled to the first conductive elastic sheet, the second conductive elastic sheet, and the controlling module, and configured to detect electrical contact between the first conductive elastic sheet and the second conductive elastic sheet and to send a result of detecting to the controlling module.

5. The computer numerical control machine of claim 4, further comprising:
   a clamping member configured to clamp and hold a tool; and
   a driving module coupled to the clamping member and the controlling module, and configured to drive the clamping member to move.

6. The computer numerical control machine of claim 4, further comprising a warning module electrically coupled to the controlling module.

7. The computer numerical control machine of claim 6, wherein the warning module comprises a lamp warning unit, the warning module receives an order sent from the controlling module and controls the lamp warning unit to give a warning.

8. The computer numerical control machine of claim 6, wherein the warning module comprises an audible warning unit, the warning module receives an order sent from the controlling module and controls the audible warning unit to sound a warning.

9. The computer numerical control machine of claim 4, wherein the base support comprises:
 a support body; and
 two mounting portions protruding from an end of the support body and spaced from each other;
 an end face of the support body and opposite side surfaces of the mounting portions cooperatively define a space;
 a first end of the first conductive elastic sheet is securely coupled to one mounting portion, a second end of the first conductive elastic sheet is located over the space;
 the first end of the second conductive elastic sheet is securely coupled to another mounting portion, the second end of the second conductive elastic sheet is located over the first conductive elastic sheet.

10. The computer numerical control machine of claim 4, wherein the predetermined distance between the first conductive elastic sheet and the second conductive elastic sheet is about 0.5 millimeters.

11. The computer numerical control machine of claim 4, further comprising two fastening members configured for fastening the first conductive elastic sheet and the second conductive elastic sheet to the base support.

* * * * *